March 27, 1928.
G. L. KELLEY
1,664,114
SOUNDPROOFING METALLIC STRUCTURE
Filed June 21, 1922
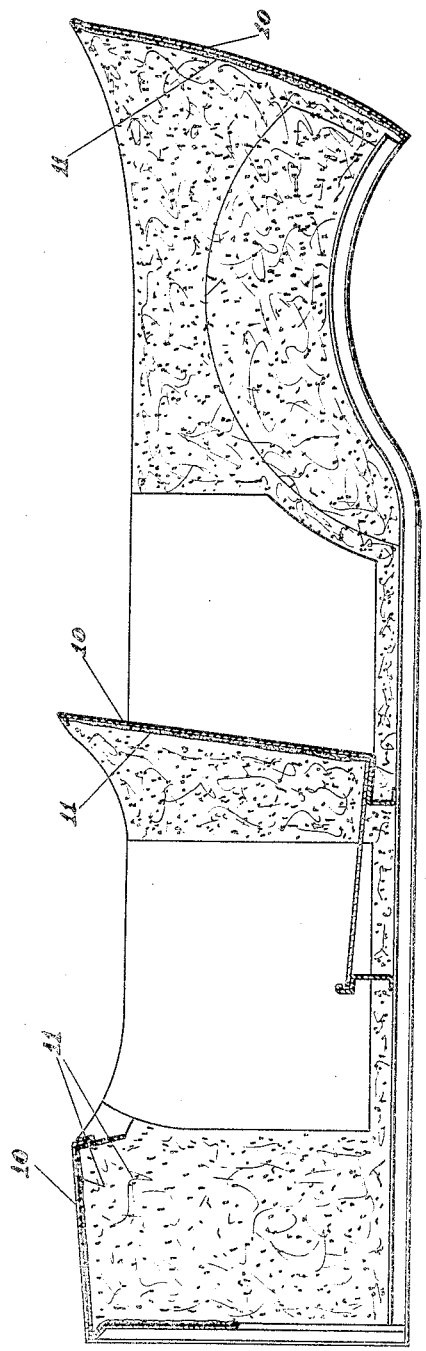
INVENTOR.
GEORGE L. KELLEY.
BY
ATTORNEY Patented Mar. 27, 1928.

1,664,114

UNITED STATES PATENT OFFICE.

GEORGE L. KELLEY, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

SOUNDPROOFING METALLIC STRUCTURE.

Application filed June 21, 1922. Serial No. 569,964.

This invention relates to soundproofing metallic structures.

The object of my invention is to provide effective and economical means for deadening or damping the sounds produced in metallic structures by vibrations set up therein, so that such structures will not be so noisy in use.

A further object of my invention is to provide a sound-proofed metallic structure and method of producing the same.

A further and more specific object of my invention is to provide a soundproofed automobile body and method for producing the same.

A further object of my invention is to provide an effective and economical material or composition of a nature capable of application to the surfaces of metallic structures or parts thereof to deaden or dampen the sounds produced by vibrations set up therein.

A further object of my invention is to provide a material or composition of the nature referred to, which readily adheres to metallic surfaces to which it is applied as a coating, which dries quickly and, when dry, is tough, light in weight and does not become brittle and will not flow within a temperature range from 150° F. to −30° F.

Further objects will definitely appear from the detailed description to follow. In one instance, I accomplish the objects of my invention by the means set forth in the following specification. My invention is clearly defined and pointed out in the appended claims. A structure embodying my invention is illustrated in the accompanying drawing, forming a part of this specification, in which the single figure is a sectional view through an automobile body treated in accordance with my invention.

When sheet metal structures are used under conditions such that they are subjected to vibrations, objectionable drumming or rumbling noises are produced due to the vibrations set up in such structures and the consequent flexing or bending of the metal. When such structures are used in places where other objects, sand, stones, pebbles, or the like, strike or impinge against them, this constitutes another source of objectionable noise, due to the metallic sound produced when objects strike against the sheet metal. Such noises are exceedingly objectionable and this is particularly true of automobile bodies constructed wholly or in part of sheet metal stampings or panels.

It is among the special purposes of my invention to provide means for deadening or damping such sounds, to provide metallic structures which are soundproofed so that the sounds produced by vibrations therein are deadened or damped, and to provide a composition of such a nature and character that, when applied to the surface of a metallic structure or body it serves to deaden or damp the vibrations set up therein, when, in use, it is subjected to shocks, jars, or the like, or is impinged upon by a stone, pebble or the like.

In carrying out my invention, I propose to apply a soundproofing coating to the metallic structure, which is to be treated to deaden or damp sounds produced by vibrations therein. I propose to use a coating composition which is easily, readily and quickly applied to the metallic surfaces of structures or bodies to be rendered soundproof, and which, when applied and dried, forms a tough and elastic film or coating which is not unduly softened or rendered brittle within the range of temperature likely to be encountered in use. I propose to provide a soundproofing composition having the foregoing characteristics and which is economical to make and readily and easily applied. I also propose, in accordance with my invention, to provide a structure composed wholly or in part of sheet metal plates, panels or stampings and soundproofed by the application to the surface or surfaces of such plates, panels or stampings of a coating of soundproofing material or composition, and, particularly, in the case of an automobile body, I propose to apply the soundproofing coating to the interior surfaces of such body so as not to interfere with the external finish or appearance.

I have discovered that a solution of asphalt in Chinawood oil, or Chinawood oil and linseed oil, the former being preferable as it forms a tougher and more elastic coating, constitutes a most excellent composition for deadening or damping the vibrations and sounds produced in bodies or articles when subjected to shocks and jars in use. I have also discovered that various other ingredients may be added to the composition to impart various qualities thereto, such as to give it firmness or body, to make it dry or set rapidly when applied, and to facilitate the application of the coating with a brush.

Examples of a soundproofing composition embodying my invention are obtained according to the following formulæ:—

Example 1.

Asphalt 43 lbs., rosin 13 lbs., gilsonite 7 lbs., Chinawood oil 26 lbs., cork flour 5 lbs., graphite 6 lbs., drier 3 oz.

Example 2.

Asphalt 48 lbs., rosin 21 lbs., gilsonite 7 lbs., Chinawood oil 13.5 lbs., linseed oil 4.5 lbs., cork flour 3 lbs., graphite 3 lbs., drier 3 oz.

The purpose of the rosin is to aid in dissolving the asphalt. The gilsonite imparts firmness to the coating composition, the cork flour gives body, and the graphite enables the composition to be applied more easily and readily with a brush. Litharge or cobalt linoleate is suitable for use as a drier. If desired, a portion of the Chinawood oil may be replaced with linseed oil as a solvent for the asphalt, as in Example 2.

The examples given are illustrative and I do not desire, therefore, to be limited or restricted to the exact ingredients and relative proportions thereof as given. The compositions produced according to either of these formulæ I have found to be effective and that produced from the formulæ of example two is not only satisfactory, but it is also somewhat less expensive.

The composition is prepared by mixing together the oil, rosin and gilsonite and heating the mass to a temperature of about 400° F. continuing the heating until the solids become melted. The drier is then added, for instance, about .5% of litharge. If a very rapid drying is desired, about .1% of cobalt linoleate may be used for the drier. The heating should be continued and increased until a temperature of about 525° F. is attained. I have found that heating for a period of two hours is sufficient. The asphalt is then added and after it has become melted, the cork flour and graphite are mixed in, keeping the mixture well stirred to prevent the graphite from settling. The composition may be applied by means of a brush and, for this purpose, should be maintained at a rather high temperature. I have found that a temperature of about 320° F. is sufficient and satisfactory for this purpose although it may be applied, but with increasing difficulty, at lesser temperatures, down to 250° F. After this coating has dried, it forms a tough and somewhat elastic film or coating which adheres tenaciously to the sheet metal surfaces to which it is applied and will neither soften unduly nor become brittle when subjected to temperatures within the range likely to be accomplished in use, for instance, from 150° F. to −30° F.

In the drawing, I have shown one specific embodiment of my invention, in which a soundproof coating, 11, is applied to the interior surfaces of the sheet metal panels 10, of an automobile body. The application of a coating, such as those above-described, to the sheet metal panels of an automobile body, or, in fact, to any other metallic structure or body composed wholly or in parts of sheet metal panels or stampings, eliminates a great deal of the noise arising in such body in use. The coating largely prevents the drumming or rumble due to the flexing or bending of the body panels under vibration and it also deadens or dampens the metallic sound due to the striking of objects, for instance, small stones, pebbles or the like, against the body panels. This application of the soundproofing composition in no way interferes with or impairs the external appearance or finish of the body and it may be effected very cheaply and easily.

While I have shown and described my invention in connection with soundproofing automobile bodies and while this field offers a particularly useful and desirable application of my invention, it is to be understood that, in the broader scope of my invention, I am not to be limited or restricted with respect to such use and field of application. I am aware that the embodiment herein disclosed may be varied considerably, without departing from the spirit of my invention and, therefore, I claim my invention broadly, as indicated by the appended claims.

Having thus decribed my invention, what I claim as new and useful and desire to secure by Letters Patent is:

1. A vehicle body construction comprising a metallic body shell and a relatively thick inner lining therefor, said lining being applied to the shell in a viscous state and formed of such a composition that upon drying it becomes a tenacious non-resilient coating lowering the vibratory period of the body shell.

2. A vehicle body construction comprising a sheet metal body shell and an inner tenacious lining therefor of different vibratory phase from the shell, said lining being applicable in a viscous state and formed of a composition having suspended particles of an appreciable size imparting body thereto, whereby it becomes applicable in very thick layers and the periods of vibrations produced in the body shell during use are lowered.

3. A vehicle body construction comprising a sheet metal body shell and an inner lining therefor, said lining being formed of a composition including a relatively plastic substance inert to vibrations when dry, dissolved in a solvent, a comminuted material of coarse texture for giving the composition body, and a drying medium.

4. A vehicle body construction comprising a sheet metal body shell and an inner lining therefor, said interlining being formed of a composition including a relatively plastic asphalt inert to vibrations when dry, dissolved in China-wood oil, a comminuted material of coarse texture for giving the composition body and a drying medium.

In testimony whereof, I affix my signature.

GEORGE L. KELLEY.